ns Patent [19]

United States Patent [19]
Togino

[11] Patent Number: 4,521,083
[45] Date of Patent: Jun. 4, 1985

[54] MICROSCOPE OBJECTIVE
[75] Inventor: Takayoshi Togino, Tokyo, Japan
[73] Assignee: Olympus Optical Co., Ltd., Tokyo, Japan
[21] Appl. No.: 553,296
[22] Filed: Nov. 18, 1983
[30] Foreign Application Priority Data
Nov. 26, 1982 [JP] Japan ............................. 57-206204
[51] Int. Cl.$^3$ .......................... G02B 9/62; G02B 21/02
[52] U.S. Cl. .................................................. 350/414
[58] Field of Search ........................................ 350/414
[56] References Cited
U.S. PATENT DOCUMENTS
3,925,910  12/1975  Matsuhara ..................... 350/467

Primary Examiner—John K. Corbin
Assistant Examiner—Rebecca D. Gass
Attorney, Agent, or Firm—Cushman, Darby & Cushman

[57] ABSTRACT

A microscope objective comprising a first, second, third, fourth, fifth and sixth lens components wherein the first and second lens components are positive lenses respectively, the third lens component is a positive cemented lens, the fourth lens component is a cemented meniscus lens arranged to be convex toward the object side, the fifth lens component is a cemented meniscus lens arranged to be concave toward the object side, and the sixth lens component is a positive cemented doublet, the microscope objective having the magnification about 20X and N.A. about 0.4 and, at the same time, having a long working distance and flat image surface.

5 Claims, 5 Drawing Figures

MICROSCOPE OBJECTIVE

BACKGROUND OF THE INVENTION (a) Field of the Invention

The present invention relates to a microscope objective and, more particularly, to a microscope objective with the magnification about 20X having a sufficiently large aperture as required, i.e., N.A. about 0.4, and still having a long working distance and flat image surface.

(b) Description of the Prior Art

As microscope objectives with flat image surface, it is known that there are such lens systems in which a meniscus lens having a concave surface with a small radius of curvature on the object side is arranged as the first lens component, and lens systems in which a meniscus lens concave toward the image side is arranged in a rear position. The objective disclosed in Japanese published unexamined patent application No. 45741/72 which adopts the Gauss type lens configuration is known as a lens system having a still longer working distance. However, the objective disclosed in said patent application has a five-component eight-element lens configuration and, when the working distance is made long in case of a lens system with a number of lens elements as mentioned in the above, rays cannot be converged unless the refractive power of the first lens component is made strong. As a result, the radius of curvature of the first lens component becomes small and spherical aberration increases. When it is attempted to correct spherical aberration, the function for correction of aberrations should be alloted to other lenses and, as a result, it becomes difficult to correct curvature of field, coma, etc. Due to the reason described in the above, there is no known microscope objective of which the working distance is long and, at the same time, the image surface is flat over a sufficiently wide field.

SUMMARY OF THE INVENTION

It is, therefore, a primary object of the present invention to provide a microscope objective of which the working distance is remarkably long, image surface is flat over a sufficiently wide field and, at the same time, aberrations are corrected satisfactorily favourably.

To compose a microscope objective with an ultra-long working distance which is an object of the present invention, it is necessary to shift the principal point toward the object side and, for that purpose, a lens having a strong negative power should be arranged on the image side.

The microscope objective according to the present invention is arranged to have such lens configuration that a lens surface having a strong negative power is arranged on the image side, at least seven surfaces having positive refractive powers are provided to positive lens components arranged on the object side and, moreover, two surfaces therein are formed as approximately aplanatic surfaces, the microscope objective according to the present invention being thereby arranged to ensure an ultra-long working distance by correcting aberrations favourably.

That is, the microscope objective according to the present invention comprises a first, second, third, fourth, fifth and sixth lens components wherein the first lens component is a positive meniscus lens arranged to be concave toward the object side, the second lens component is a positive meniscus lens, the third lens component is a positive cemented lens component consisting of two or three lens elements, the fourth lens component is a negative cemented meniscus lens arranged to be convex toward the object side, the fifth lens component is a negative cemented meniscus lens having a concave surface with a strong refractive power on the object side, and the sixth lens component is a positive cemented doublet, the microscope objective according to the present invention being arranged to fulfill the conditions (1) through (6) shown below:

(1) $2.5f < |r_1/(n_1 - 1)| < 3.5f$, $r_1 < 0$
(2) $0.45f < r_{10} < 0.55f$
(3) $0.45f < |r_{11}| < 0.65f$, $r_{11} < 0$
(4) $\nu_5, \nu_8 \geq 65$
(5) $10f < |f_{56}| < 50f$
(6) $n_9 - n_{10} \geq 0.18$ where, reference symbol $f$ represents the focal length of the lens system as a whole, reference symbol $f_{56}$ represents the total focal length of the fifth and sixth lens compoennts, reference symbol $r_1$ represents the radius of curvature of the surface on the object side of the first lens component, reference symbol $r_{10}$ represents the radius of curvature of the surface on the image side of the fourth lens component, reference symbol $r_{11}$ represents the radius of curvature of the surface on the object side of the fifth lens component, reference symbol $n_1$ represents the refractive index of the first lens component, reference symbols $n_9$ and $n_{10}$ respectively represent refractive indices of respective lens elements constituting the sixth lens component, reference symbol $\nu_5$ represents Abbe's number of the lens element on the object side in the fourth elns component, and reference symbol $\nu_8$ represents Abbe's number of the lens element on the image side in the fifth lens component.

The condition (1) is established in order to ensure the free working distance. If the radius of curvature $r_1$ of the surface on the object side of the first lens component becomes smaller than the lower limit of the condition (1), the free working distance becomes small though it is possible to ensure the optical working distance. If $r_1$ becomes larger than the upper limit of the condition (1), said surface gets away from the aplanatic condition. As a result, spherical aberration becomes unfavourable and it is impossible to correct it by other lenses.

Both of the conditions (2) and (3) relate to correction of curvature of field. If $r_{10}$ and/or $|r_{11}|$ becomes larger than the upper limit of the corresponding condition, Petzval's sum becomes large. As a result, the flatness of the image surface becomes unfavourable and it is impossible to correct it by other lens surfaces. If $r_{10}$ and/or $|r_{11}|$ becomes smaller than the lower limit of the corresponding condition, coma increases though Petzva's sum becomes small, and it is impossible to correct aberrations in a well balanced state.

The condition (4) is established in order to correct chromatic aberration. Unless chromatic aberration is supressed by using materials with Abbe's numbers 65 or more for the convex lenses in the cemented doublets constituting the fourth and fifth lens components, it is impossible to correct chromatic aberration by other lenses. In other words, chromatic aberration becomes unfavourable if the condition (4) is not fulfilled.

The condition (5) is established in order to correct coma. Coma becomes negative when $|f_{56}|$ becomes larger than the upper limit of the condition (5) and becomes positive when $|f_{56}|$ becomes smaller than the lower limit of the condition (5). In either case, it is impossible to correct coma by other lenses.

The condition (6) also serves to correct coma. If the value defined by the condition (6) becomes smaller than the lower limit thereof, it is impossible to correct coma which is caused by the lens components arranged in the front portion of the lens system and, consequently, coma becomes a large positive value.

DETAILED DESCRIPTION OF THE PREFERRED EMBODIMENTS

Figure 1:
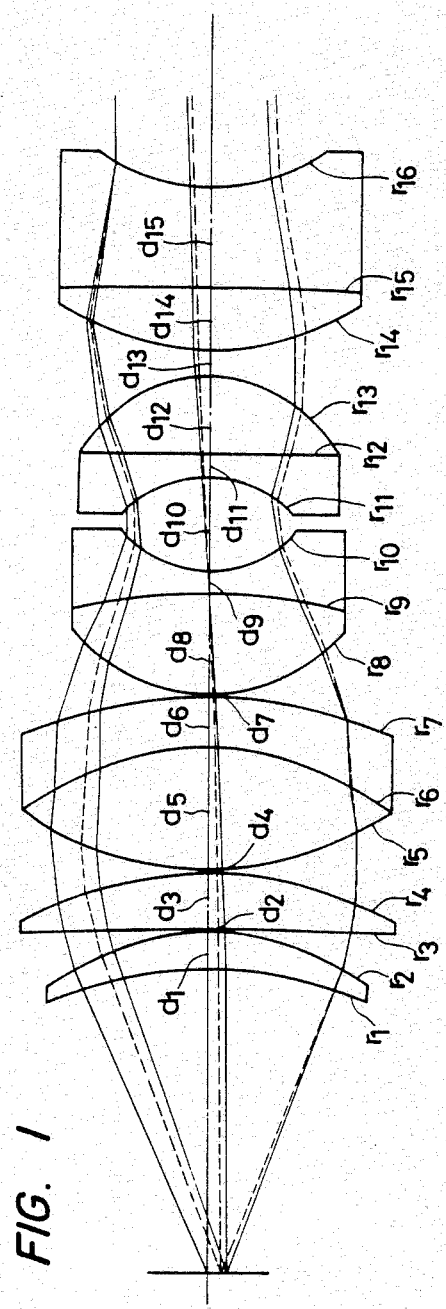
FIG. 1 shows a sectional view of Embodiment 1 of the microscope objective according to the present invention.

Now, preferred embodiments of the microscope objective according to the present invention described so far are shown below.

| Embodiment 1 |
|---|

$f = 1$, $NA = 0.4$, $WD = 1.334$, $\beta = -20X$
$f_{56} = -12.99$, $r_1/(n_1 - 1) = -2.936$

| | | |
|---|---|---|
| $r_1 = -1.740$ | | |
| $d_1 = 0.1668$ | $n_1 = 1.5927$ | $\nu_1 = 35.29$ |
| $r_2 = -1.134$ | | |
| $d_2 = 0.0111$ | | |
| $r_3 = -22.781$ | | |
| $d_3 = 0.2446$ | $n_2 = 1.4970$ | $\nu_2 = 81.61$ |
| $r_4 = -1.639$ | | |
| $d_4 = 0.0167$ | | |
| $r_5 = 1.442$ | | |
| $d_5 = 0.5449$ | $n_3 = 1.4970$ | $\nu_4 = 81.61$ |
| $r_6 = -1.277$ | | |
| $d_6 = 0.2113$ | $n_4 = 1.6968$ | $\nu_4 = 56.49$ |
| $r_7 = -2.075$ | | |
| $d_7 = 0.0111$ | | |
| $r_8 = 0.790$ | | |
| $d_8 = 0.4337$ | $n_5 = 1.4970$ | $\nu_5 = 81.61$ |
| $r_9 = -2.582$ | | |
| $d_9 = 0.1001$ | $n_6 = 1.71736$ | $\nu_6 = 29.51$ |
| $r_{10} = 0.500$ | | |
| $d_{10} = 0.4003$ | | |
| $r_{11} = -0.505$ | | |
| $d_{11} = 0.1001$ | $n_7 = 1.68893$ | $\nu_7 = 31.08$ |
| $r_{12} = 19.856$ | | |
| $d_{12} = 0.3558$ | $n_8 = 1.497$ | $\nu_8 = 81.61$ |
| $r_{13} = -0.650$ | | |
| $d_{13} = 0.1101$ | | |
| $r_{14} = 1.180$ | | |
| $d_{14} = 0.2780$ | $n_9 = 1.78472$ | $\nu_9 = 25.71$ |
| $r_{15} = -24.911$ | | |
| $d_{15} = 0.4448$ | $n_{10} = 1.53172$ | $\nu_{10} = 48.90$ |
| $r_{16} = 0.809$ | | |

| Embodiment 2 |
|---|

$f = 1$, $NA = 0.4$, $WD = 1.334$, $\beta = -20X$
$f_{56} = 32.102$, $r_1/(n_1 - 1) = -3.469$

| | | |
|---|---|---|
| $r_1 = -2.5704$ | | |
| $d_1 = 0.2124$ | $n_1 = 1.741$ | $\nu_1 = 52.68$ |
| $r_2 = -1.2798$ | | |
| $d_2 = 0.0178$ | | |
| $r_3 = 3.0020$ | | |
| $d_3 = 0.3892$ | $n_2 = 1.497$ | $\nu_2 = 81.61$ |
| $r_4 = -2.5063$ | | |

-continued

| | | |
|---|---|---|
| $d_4 = 0.0111$ | | |
| $r_5 = 2.0489$ | | |
| $d_5 = 0.1334$ | $n_3 = 1.51821$ | $\nu_3 = 65.04$ |
| $r_6 = 0.8896$ | | |
| $d_6 = 0.4378$ | $n_4 = 1.497$ | $\nu_4 = 81.61$ |
| $r_7 = -2.0670$ | | |
| $d_6 = 0.1334$ | $n_4 = 1.7725$ | $\nu_4 = 49.66$ |
| $r_7 = -4.7178$ | | |
| $d_7 = 0.0111$ | | |
| $r_8 = 1.1023$ | | |
| $d_8 = 0.3336$ | $n_5 = 1.497$ | $\nu_5 = 81.61$ |
| $r_9 = -4.5591$ | | |
| $d_9 = 0.7499$ | $n_6 = 1.74$ | $\nu_6 = 28.29$ |
| $r_{10} = 0.5034$ | | |
| $d_{10} = 0.2224$ | | |
| $r_{11} = -0.5871$ | | |
| $d_{11} = 0.1001$ | $n_7 = 1.72047$ | $\nu_7 = 34.72$ |
| $r_{12} = 1.7822$ | | |
| $d_{12} = 0.3063$ | $n_8 = 1.497$ | $\nu_8 = 81.61$ |
| $r_{13} = -0.8096$ | | |
| $d_{13} = 0.0111$ | | |
| $r_{14} = 2.5936$ | | |
| $d_{14} = 0.2891$ | $n_9 = 1.7495$ | $\nu_9 = 35.27$ |
| $r_{15} = -0.8368$ | | |
| $d_{15} = 0.1334$ | $n_{10} = 1.54771$ | $\nu_{10} = 62.83$ |
| $r_{16} = 4.6508$ | | |

In embodiments shown in the above, reference symbols $r_1$ through $r_{16}$ respectively represent radii of curvature of respective lens surfaces, reference symbols $d_1$ through $d_{15}$ respectively represent thicknesses of respective lenses and airspaces between respective lenses, reference symbols $n_1$ through $n_{10}$ respectively represent refractive indices of respective lenses, and reference sybmols $\nu_1$ through $\nu_{10}$ respectively represent Abbe's numbers of respective lenses.

Figure 2:
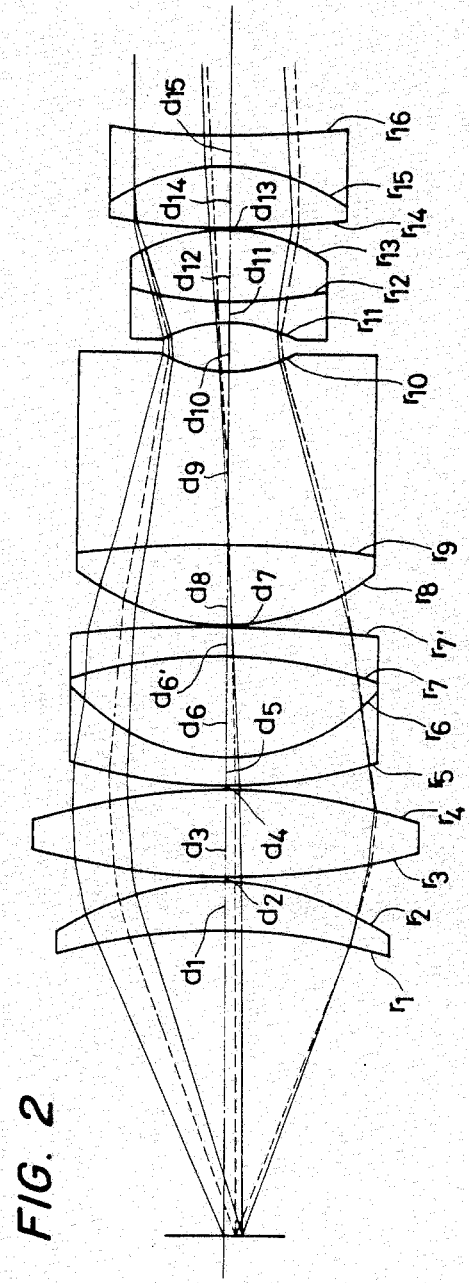
FIG. 2 shows a sectional view of Embodiment 2 of the microscope objective according to the present invention.
Figure 5:
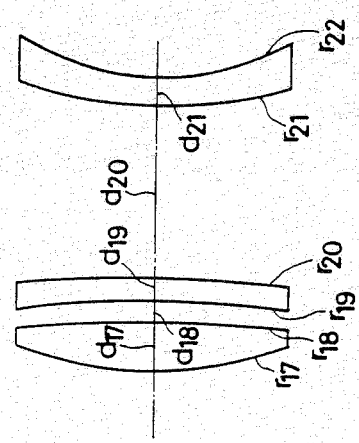
FIG. 5 shows a sectional view illustrating an example of an imaging lens system to be used together with a microscope objective which is designed to form an image in the position of infinite distance.

Out of respective embodiments shown in the above, Embodiment 1 has the lens configuration as shown in FIG. 1, and the third lens component thereof is arranged as a cemented doublet. Embodiment 2 has the lens configuration as shown in FIG. 2, and the third lens component thereof is arranged as a cemented lens component consisting of three lens elements. Both of said embodiments are microscope objectives which are designed to form an image in the position of infinite distance. Therefore, they are to be used in combination with an imaging lens system which has, for example, a lens configuration as shown in FIG. 5 and numerical data as shown below.

| | | |
|---|---|---|
| $r_{17} = 3.282$ | | |
| $d_{17} = 0.4447$ | $n_{11} = 1.4875$ | $\nu_{11} = 70.15$ |
| $r_{18} = -12.536$ | | |
| $d_{18} = 0.2223$ | | |
| $r_{19} = -6.394$ | | |
| $d_{19} = 0.2223$ | $n_{12} = 1.7400$ | $\nu_{12} = 28.29$ |
| $r_{20} = -13.591$ | | |
| $d_{20} = 1.6674$ | | |
| $r_{21} = 4.885$ | | |
| $d_{21} = 0.2001$ | $n_{13} = 1.4875$ | $\nu_{13} = 70.15$ |
| $r_{22} = 2.184$ | | |

The numerical data of the imaging lens system shown in the above represents the values when the focal length f of the lens system as a whole of the microscope objective according to Embodiment 1 is regarded as $f = 1$.

As described so far and as shown by respective embodiments, the microscope objective according to the present invention ensures an ultra-long working distance by keeping N.A. equivalent to those of known long working distance microscope objectives and without causing decrease in the resolving power. The microscope objective according to Embodiment 1 comprises ten lens elements and has a working distance of 12 mm and flat image surface over a wide field up to the field number of 27. The microscope objective according to Embodiment 2 is arranged to correct offaxial chromatic aberration more favourably by using a cemented lens component consisting of three lens elements.

Figure 3:
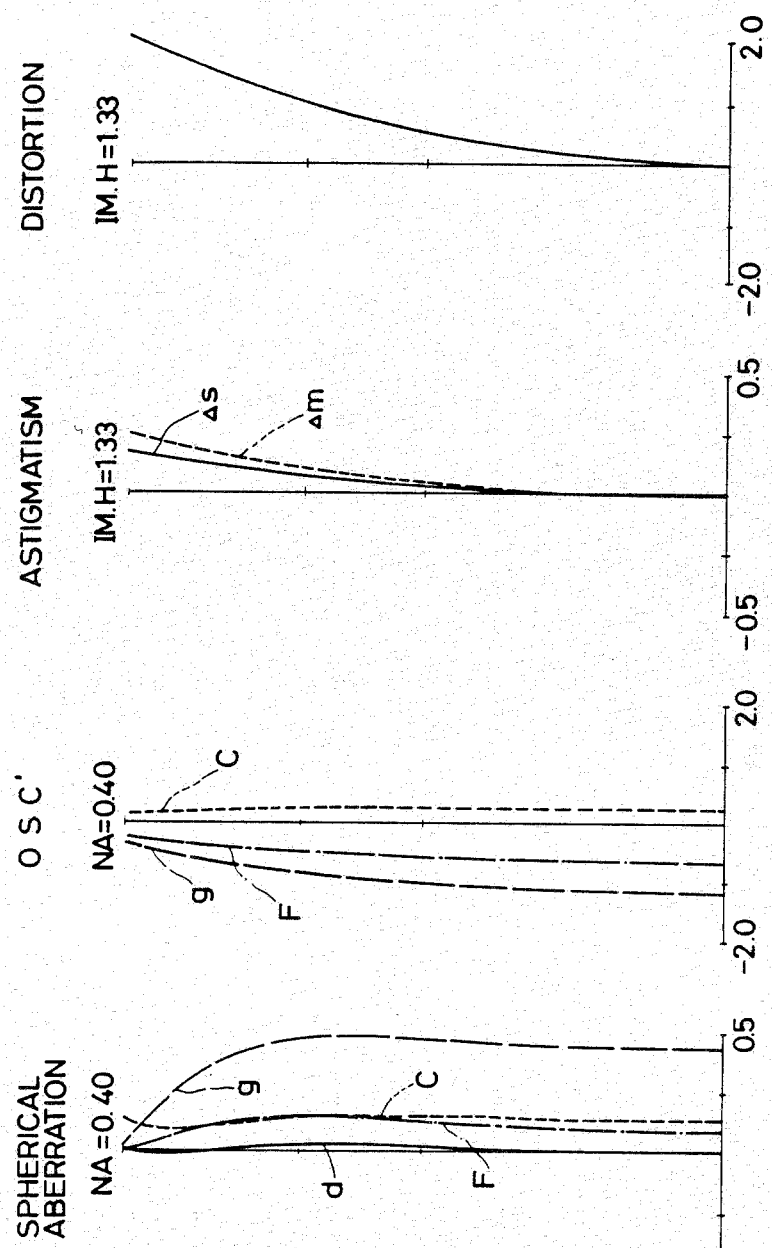
FIGS. 3 and 4 respectively show graphs illustrating aberration curves of Embodments 1 and 2 of the present invention.
Figure 4:
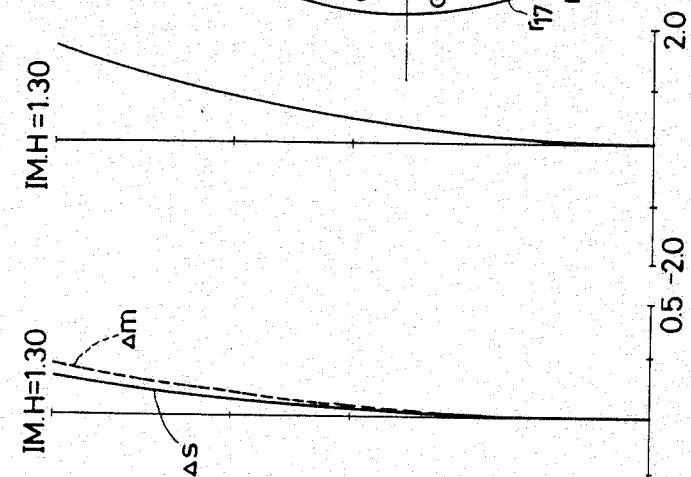

Graphs of aberration curves of these embodiments, when combined with the imaging lens system shown in FIG. 5, are as shown in FIGS. 3 and 4.

I claim:

1. A microscope objective comprising a first, second, third, fourth, fifth and sixth lens components wherein said first lens component is a positive lens, said second lens component is a positive lens, said third lens component is a positive cemented lens, said fourth lens component is a cemented meniscus lens arranged to be convex toward the object side, said fifth lens component is a cemented meniscus lens arranged to be concave toward the object side, and said sixth lens component is a cemented meniscus lens, said microscope objective being arranged to fulfill the following conditions:

(1) $2.5f < |r_1/(n_1-1)| < 3.5f$, $r_1 < 0$
(2) $0.45f < r_{10} < 0.55f$
(3) $0.45f < r_{11} < 0.65f$, $r_{11} < 0$
(4) $\nu_5, \nu_8 \geq 65$
(5) $10f < |f_{56}| < 50f$
(6) $n_9 - n_{10} \geq 0.18$ where, reference symbol f represents the focal length of the lens system as a whole, reference symbol $f_{56}$ represents the total focal length of the fifth and sixth lens components, reference symbol $r_1$ represents the radius of curvature of the surface on the object side of the first lens component, reference symbol $r_{10}$ represents the radius of curvature of the surface on the image side of the fourth lens component, reference symbol $r_{11}$ represents the radius of curvature of the surface on the object side of the fifth lens component, reference symbol $n_1$ represents the refractive index of the first lens component, reference symbols $n_9$ and $n_{10}$ respectively represent refractive indices of respective lens elements constituting the sixth lens component, reference symbol $\nu_5$ represents Abbe's number of the lens element on the object side in the fourth lens component, and reference symbol $\nu_8$ represents Abbe's number of the lens element on the image side in the fifth lens component.

2. A microscope objective according to claim 1 wherein said third lens component is arranged as a positive cemented doublet.

3. A microscope objective according to claim 2, in which said microscope objective has the following numerical data:

| $f = 1$, NA $= 0.4$, WD $= 1.334$, $\beta = -20X$ | | |
|---|---|---|
| $f_{56} = -12.99$, $r_1/(n_1 - 1) = -2.936$ | | |
| $r_1 = -1.740$ | | |
| $d_1 = 0.1668$ | $n_1 = 1.5927$ | $\nu_1 = 35.29$ |
| $r_2 = -1.134$ | | |
| $d_2 = 0.0111$ | | |
| $r_3 = -22.781$ | | |
| $d_3 = 0.2446$ | $n_2 = 1.4970$ | $\nu_2 = 81.61$ |
| $r_4 = -1.639$ | | |
| $d_4 = 0.0167$ | | |
| $r_5 = 1.442$ | | |
| $d_5 = 0.5449$ | $n_3 = 1.4970$ | $\nu_3 = 81.61$ |
| $r_6 = -1.277$ | | |
| $d_6 = 0.2113$ | $n_4 = 1.6968$ | $\nu_4 = 56.49$ |
| $r_7 = -2.075$ | | |
| $d_7 = 0.0111$ | | |
| $r_8 = 0.790$ | | |
| $d_8 = 0.4337$ | $n_5 = 1.4970$ | $\nu_5 = 81.61$ |
| $r_9 = -2.582$ | | |
| $d_9 = 0.1001$ | $n_6 = 1.71736$ | $\nu_6 = 29.51$ |
| $r_{10} = 0.500$ | | |
| $d_{10} = 0.4003$ | | |
| $r_{11} = -0.505$ | | |
| $d_{11} = 0.1001$ | $n_7 = 1.68893$ | $\nu_7 = 31.08$ |
| $r_{12} = 19.856$ | | |
| $d_{12} = 0.3558$ | $n_8 = 1.497$ | $\nu_8 = 81.61$ |
| $r_{13} = -0.650$ | | |
| $d_{13} = 0.1101$ | | |
| $r_{14} = 1.180$ | | |
| $d_{14} = 0.2780$ | $n_9 = 1.78472$ | $\nu_9 = 25.71$ |
| $r_{15} = -24.911$ | | |
| $d_{15} = 0.4448$ | $n_{10} = 1.53172$ | $\nu_{10} = 48.90$ |
| $r_{16} = 0.809$ | | | where, reference symbols $r_1$ through $r_{16}$ respectively represent radii of curvature of respective lens surfaces, reference symbols $d_1$ through $d_{15}$ respectively represent thicknesses of respective lenses and airspaces between respective lenses, reference symbols $n_1$ through $n_{10}$ respectively represent refractive indices of respective lenses, and reference symbols $\nu_1$ through $\nu_{10}$ respectively represent Abbe's numbers of respective lenses.

4. A microscope objective according to claim 1 wherein said third lens component is arranged as a positive cemented lens consisting of three lens elements.

5. A microscope objective according to claim 4, in which said microscope objective has the following numerical data:

| $f = 1$, NA $= 0.4$, WD $= 1.334$, $\beta = -20X$ | | |
|---|---|---|
| $f_{56} = 32.102$, $r_1/(n_1 - 1) = -3.469$ | | |
| $r_1 = -2.5704$ | | |
| $d_1 = 0.2124$ | $n_1 = 1.741$ | $\nu_1 = 52.68$ |
| $r_2 = -1.2798$ | | |
| $d_2 = 0.0178$ | | |
| $r_3 = 3.0020$ | | |
| $d_3 = 0.3892$ | $n_2 = 1.497$ | $\nu_2 = 81.61$ |
| $r_4 = -2.5063$ | | |
| $d_4 = 0.0111$ | | |
| $r_5 = 2.0489$ | | |
| $d_5 = 0.1334$ | $n_3 = 1.51821$ | $\nu_3 = 65.04$ |
| $r_6 = 0.8896$ | | |
| $d_6 = 0.4378$ | $n_4 = 1.497$ | $\nu_4 = 81.61$ |
| $r_7 = -2.0670$ | | |
| $d_6 = 0.1334$ | $n_4 = 1.7725$ | $\nu_4 = 49.66$ |
| $r_7 = -4.7178$ | | |
| $d_7 = 0.0111$ | | |
| $r_8 = 1.1023$ | | |
| $d_8 = 0.3336$ | $n_5 = 1.497$ | $\nu_5 = 81.61$ |
| $r_9 = -4.5591$ | | |
| $d_9 = 0.7499$ | $n_6 = 1.74$ | $\nu_6 = 28.29$ |
| $r_{10} = 0.5034$ | | |
| $d_{10} = 0.2224$ | | |
| $r_{11} = -0.5871$ | | |
| $d_{11} = 0.1001$ | $n_7 = 1.72047$ | $\nu_7 = 34.72$ |
| $r_{12} = 1.7822$ | | |
| $d_{12} = 0.3063$ | $n_8 = 1.497$ | $\nu_8 = 81.61$ |
| $r_{13} = -0.8096$ | | |
| $d_{13} = 0.0111$ | | |
| $r_{14} = 2.5936$ | | |
| $d_{14} = 0.2891$ | $n_9 = 1.7495$ | $\nu_9 = 35.27$ |
| $r_{15} = -0.8368$ | | |
| $d_{15} = 0.1334$ | $n_{10} = 1.54771$ | $\nu_{10} = 62.83$ |
| $r_{16} = 4.6508$ | | | where, reference symbols $r_1$ through $r_{16}$ respectively represent radii of curvature of respective lens surfaces, reference symbols $d_1$ through $d_{15}$ respectively represent thicknesses of respective lenses and airspaces between respective lenses, reference symbols $n_1$ through $n_{10}$ respectively represent refractive indices of respective lenses, and reference symbols $\nu_1$ through $\nu_{10}$ respectively represent Abbe's numbers of respective lenses.

* * * * *